(12) United States Patent
Ersoy

(10) Patent No.: US 6,615,684 B1
(45) Date of Patent: Sep. 9, 2003

(54) BRAKE PEDAL ASSEMBLY FOR MOTOR VEHICLES

(75) Inventor: Metin Ersoy, Walluf (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/743,014

(22) PCT Filed: Apr. 25, 2000

(86) PCT No.: PCT/DE00/01265

§ 371 (c)(1),
(2), (4) Date: Feb. 16, 2001

(87) PCT Pub. No.: WO00/66404

PCT Pub. Date: Nov. 9, 2000

(30) Foreign Application Priority Data

Apr. 29, 1999 (DE) .......................... 199 19 749

(51) Int. Cl.⁷ .............................. G05G 1/14; B60T 7/06
(52) U.S. Cl. .......................... 74/512; 74/560; 188/72.1; 188/72.6
(58) Field of Search .................. 79/512, 560; 188/72.1, 188/72.4, 72.6

(56) References Cited

U.S. PATENT DOCUMENTS 5,211,019 A    5/1993   Bauer
5,848,558 A *  12/1998  Isono et al. .................... 74/512
6,112,615 A *  9/2000   Nawata et al. ................. 74/512

FOREIGN PATENT DOCUMENTS

| DE | 3107918 A1 | 9/1982 |
| DE | 19533235 A1 | 3/1997 |
| EP | 0062268 A1 | 10/1982 |
| JP | 9-290714 | * 11/1997 | ............. B60T/7/06 |

* cited by examiner

Primary Examiner—William C Joyce
Assistant Examiner—Timothy McAnulty
(74) Attorney, Agent, or Firm—McGlew and Tuttle, P.C.

(57) ABSTRACT

A brake pedal mechanism (4) for motor vehicles with a pedal block(5), which is fastened to the body of the motor vehicle and accommodates a mount (18) for the pivot axis (17) of a rotatably mounted actuating pedal (6). The pedal (6) is provided with a pedal surface (9), wherein an actuating element (7) is articulated to the actuating pedal (6) for a brake power booster (1) with a main brake cylinder (2). The pivot axis (17) mounted on the pedal block (5) is arranged on the actuating pedal (6) between the pedal surface (9) and the articulation point (8) of the actuating element (7).

10 Claims, 2 Drawing Sheets

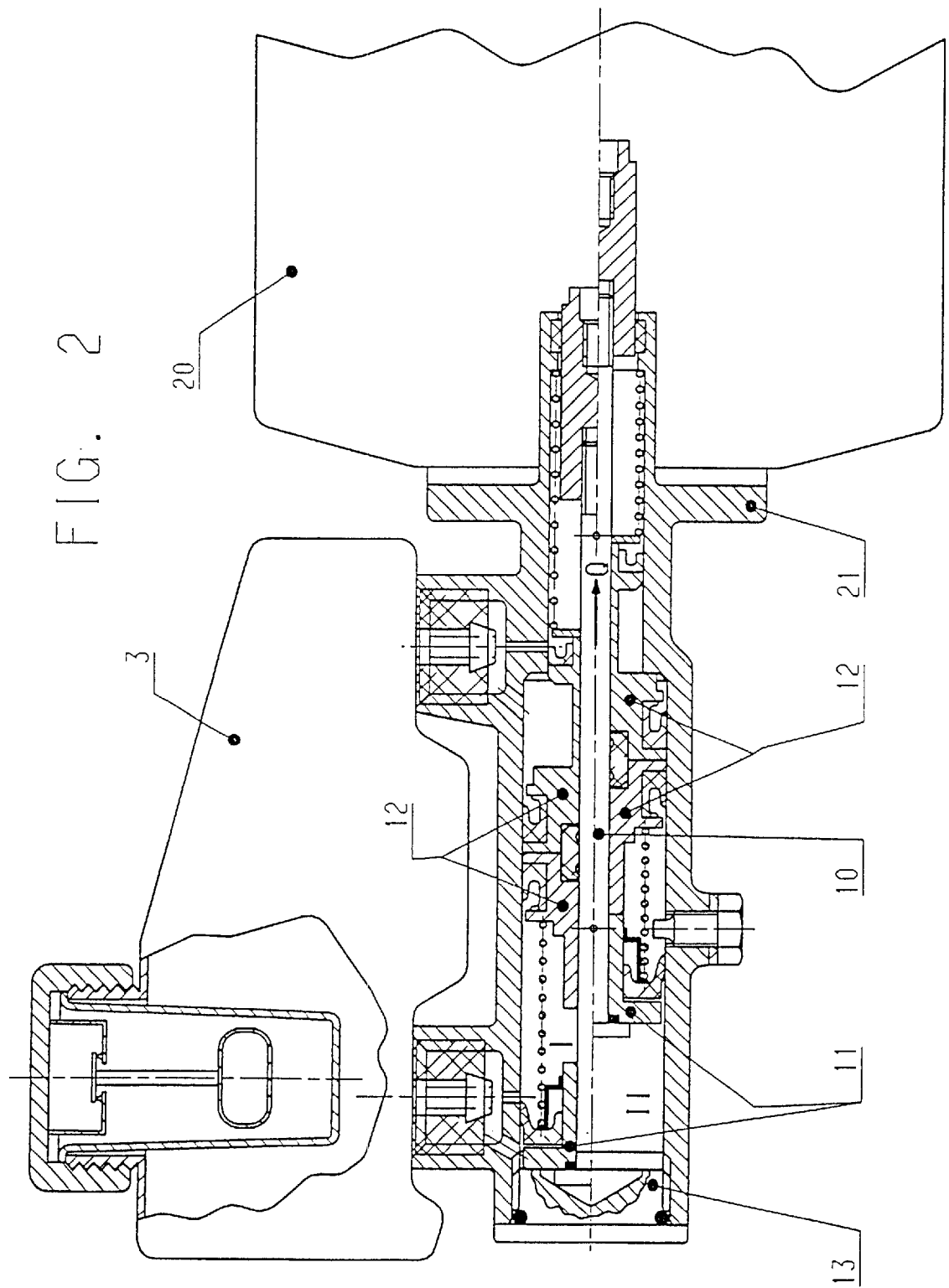

BRAKE PEDAL ASSEMBLY FOR MOTOR VEHICLES

FIELD OF THE INVENTION

The present invention pertains to a brake pedal mechanism for motor vehicles with a pedal block, which is fastened to the body of the motor vehicle and accommodates a mount for the pivot axis of a rotatably mounted actuating pedal provided with a pedal surface, wherein an actuating element for a brake power booster is articulated to the actuating pedal.

BACKGROUND OF THE INVENTION

Various embodiments of brake pedal mechanisms of the above-described type of this class are installed in each motor vehicle. They are used to transmit the brake power applied by the driver of the vehicle during the braking operation by actuating the brake pedal to the main brake cylinder via the brake booster, where the brake power is converted into hydraulic or pneumatic energy. In the case of usual requirements imposed on the upper, free end of the actuating pedal facing away from the pedal surface, the actuating pedal is mounted rotatably, and the articulation point for the actuating element of the brake power booster is arranged between the pedal surface and the mount of the brake pedal. The power transmission by the actuating element from the actuating pedal to the brake power booster or to the main brake cylinder is subjected to pressure. The overall length of the brake system from the main brake cylinder to the actuating pedal is approx. 400 mm and thus extends far into the engine compartment of the motor vehicle, which is disadvantageous especially in the case of an accident. Various suggested solutions have been developed in the state of the art to prevent the actuating pedal from penetrating into the passenger compartment due to the rearward displacement of the main brake cylinder and the brake power booster in accident situations.

For example, the entire brake module of the motor vehicle may be supported by a crossbeam, which brings about the tilting of the brake cylinder or the kinking of the actuating plunger rod. These solutions are disclosed, e.g., in EP 0 836 968 as well as DE 196 06 690 and DE 196 06 427.

In addition, a solution was proposed according to which the brake pedal is prevented from penetrating into the foot area of the passenger compartment by the brake pedal being separated from its mount in an accident situation (DE 196 51 013) or by the brake power booster being arranged transversely rather than longitudinally, which is disclosed in DE 196 32 330.

The common feature of all the possible solutions is that they require additional components and fastening points, have a complicated design and require much space for their installation and thus make the entire brake system more expensive.

SUMMARY AND OBJECTS OF THE INVENTION

The object of the present invention is therefore to develop a brake pedal mechanism for motor vehicles in which it is ensured that the penetration of the brake pedal into the foot area of the passenger compartment is ruled out reliably and in which an inexpensive manufacture is at the same time possible while minimizing the space necessary for the installation.

This object is accomplished according to the present invention by the pivot axis mounted on the pedal block being arranged at the actuating pedal between the pedal surface and the articulation point of the actuating element for the brake power booster.

Due to this design embodiment, the actuating pedal is automatically pivoted away from the driver's foot area during the movement of the main brake cylinder and of the brake power booster in the direction of the passenger compartment. A risk of injury or jamming for the extremities of the driver of the vehicle is thus reliably ruled out. Moreover, the central mounting of the actuating pedal makes it possible to shorten the length of the pedal because a larger pivot angle of the brake pedal is possible for the brake power booster as a consequence of the straight-line motion of the actuating element. Due to the central mounting of the actuating pedal, it is, of course, necessary to design the brake power booster and the main brake cylinder such that these no longer respond to pressure but to pull. Such a mode of operation can be obtained for the main brake cylinder, e.g., by rotating the two working pistons or by using a pulling piston rod which passes through a central hole of both pistons. The overall length of the piston arrangement may also be reduced.

Actuation by pulling instead of actuation by pressure has the great advantage in the case of the brake power booster. The latter can have a very simple design because actuation by pulling leads to a pulling together of the individual components of the brake power booster. Thus, it is no longer necessary to take special precautionary measures against the pulling apart of the brake power booster halves. The tension rods currently used in brake power boosters, whose use requires an additional design effort concerning the sealing of the pistons of the brake power booster against the tie rod, are eliminated for this reasons.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a sectional view through a main brake cylinder as part of the brake system connected to the brake pedal mechanism showing two operative states, above and below the center line.

DESCRIPTION OF THE PREFERRED EMBODIMENT

Figure 1:
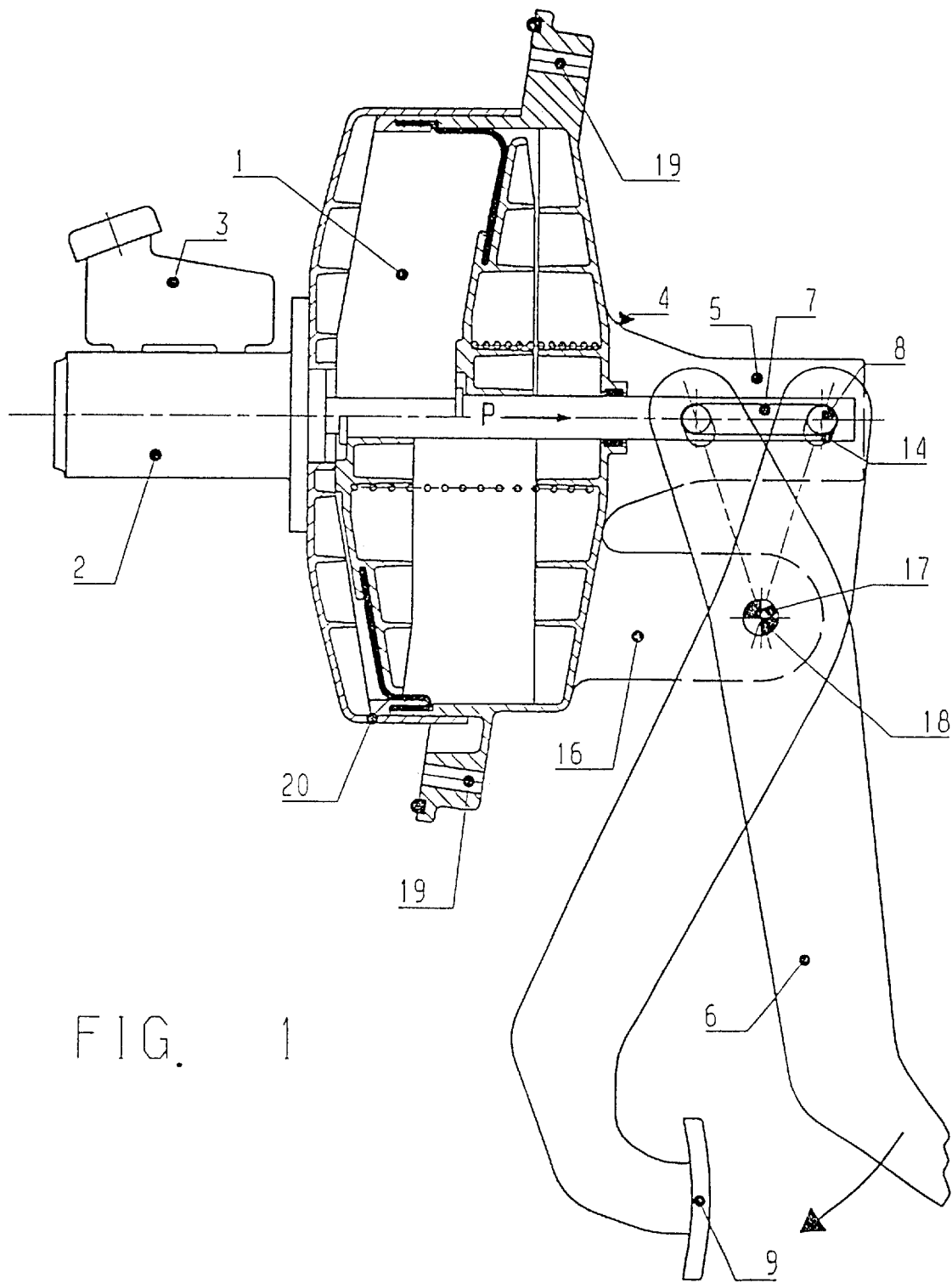
FIG. 1 is a side view of a brake pedal mechanism according to the present invention showing two operative states, above and below the center line.

Referring to the drawings in particular, the assembly unit for actuating a hydraulic brake system for motor vehicles, which is shown in FIG. 1, comprises a pneumatic brake power booster 1, a main brake cylinder 2, which is arranged downstream of the brake power booster and is shown only schematically in FIG. 1, a pressurizing agent reservoir 3 arranged on the main brake cylinder 2, as well as a pedal mechanism, which is arranged upstream of the brake power booster 1 and is designed as a whole by the reference number 4. The brake power booster 1 has a brake power booster housing 20, which is flanged to a pedal block 5 of the brake pedal mechanism 4. The pedal block 5 can be fixed on the body of the motor vehicle with fastening means not specifically shown here by means of holes 19. On its side facing away from the brake power booster, the pedal block has a bracket 16, which has a mount 18 for a pivot axis 17 of the actuating or brake pedal 6.

A design in which additional mounts for, e.g, a clutch pedal and/or gas pedal are provided is, of course, conceivable as well. The actuation of the brake power booster 1 by the actuating pedal 6 takes place by means of an actuating element 7, which is designed as a tie rod. The latter is mounted with one of its ends, which is a free end projecting over the brake power booster . . . , in an articulation point 8 at the actuating pedal 6. As is clearly seen from FIG. 1, the pivot axis 17 is located in a middle area of the actuating pedal 6 between the upper mount 8 for the tie rod 7 and the lower end of the actuating pedal with the pedal surface 9. The articulation point upper mount 8 is connected to actuating pedal 6 via elongated opening 14. It is guaranteed by this special mounting arrangement that a movement of the tie rod 7 in the direction of arrow P as a consequence of an accident will automatically cause the pedal surface 9 of the actuating pedal 6 to be pivoted out of the immediate area of the feet of the driver of the vehicle.

The risk for injury or jamming of the lower extremities is thus considerably reduced.

A movement of the tie rod 7 in the direction of arrow P is also brought about in the normal drive mode, and additional power is made available within the brake power booster, which is helpful for the actuation of the main brake cylinder 2. The connection between the tie rod 7 and the piston rod 10 of the main brake cylinder 2 takes place, as is apparent from FIG. 2, at the front seam between the brake power booster housing 20 and the main brake cylinder housing 21. This front seam is located in the engine compartment. Since the piston rod 10 acts as a pulling piston rod due to the novel design of the brake pedal mechanism 4, a novel design of the main brake cylinder 2 is necessary compared with the state of the art. This novel design is shown in FIG. 2 and its essence is basically that the pulling piston rod is guided by a central hole of the pistons 11 and 12 arranged in the main brake cylinder. To illustrate the different positions of the pistons 11 and 12, FIG. 2 shows in a partial view I of the main brake cylinder in the so-called non-operative state, in which the piston rod 10 is in contact with the end plate 13 of the main brake cylinder 2. If the actuating pedal 6 is pivoted, the piston rod 10 is displaced in the direction of the arrow Q via the intermediary of the tie rod 7, and the pistons 11 and 12 assume the position II shown in the lower part of the drawing. As a result of this a corresponding brake pressure is generated within the brake system of the motor vehicle.

The description of the figures shows clearly once again that the risk of injury in an accident situation is considerably reduced, on the one hand, due to the novel design of the brake pedal mechanism, and, moreover, pressing together of the individual components of the brake power booster is brought about during the application of power to the actuating pedal, unlike in the systems known from the state of the art. Due to this pressing together of the individual parts of the module of the brake power booster 1, the entire system of the brake power booster can be made simpler and less expensive, because measures that were previously necessary to stabilize the housing, such as tension rods, etc., can be eliminated, which leads to a reduction in the number of the components. However, it is, moreover, more important from the viewpoint of the cost factor that sealing of the pistons against the tie rods can be eliminated because of the absence of tie rods.

Another advantage of the pulling according to the present invention is that the air inlet of the brake power booster 1 can be placed into the engine compartment. The inevitable hissing noises, which are usually associated with the operation of the brake power booster during the drawing in of air, are consequently kept thus reliably away from the interior space of the vehicle.

While specific embodiments of the invention have been shown and described in detail to illustrate the application of the principles of the invention, it will be understood that the invention may be embodied otherwise without departing from such principles.

What is claimed is:

1. A motor vehicle brake pedal mechanism, comprising:
   a pivotably mounted actuating pedal with a pedal surface and with a pivot axis;
   a pedal block fastened to the body of the motor vehicle and providing a mount for said pivot axis;
   a brake power booster;
   a main brake cylinder with a piston rod;
   an actuating element articulated to said actuating pedal and connected to said brake power booster and connected to said main brake cylinder, said brake power booster and said main brake cylinder arranged in series, said actuating element assisted by said brake power booster applying a pulling force to said main brake cylinder to generate brake pressure, said pivot axis being mounted via said mount on said pedal block with the position of said pivot axis, with respect to said actuating pedal, being arranged between said pedal surface and an articulation point of said actuating element.

2. A brake pedal mechanism for motor vehicles in accordance with claim 1, wherein said actuating element is a tie rod guided at an interface with said actuating pedal in an elongated hole in said actuating pedal.

3. A brake pedal mechanism for motor vehicles in accordance with claim 2, wherein said brake cylinder includes brake cylinder pistons and said piston rod is a central pulling piston rod of said main brake cylinder and said tie rod is connected to said central pulling piston rod of said main brake cylinder, wherein said pulling piston rod is arranged in central holes of said brake cylinder pistons.

4. A motor vehicle brake pedal mechanism system, comprising:
   an actuating pedal with a pedal surface and a portion extending from said pedal surface with a pivot axis;
   a pedal block fastened to the body of the motor vehicle and providing a mount for supporting said actuating pedal to define a location of said pivot axis;
   a brake power booster;
   a main brake cylinder with a central pulling piston rod and brake cylinder pistons, said pulling piston rod being arranged in central holes of said brake cylinder pistons;
   an actuating element in series with said brake power booster and said main brake cylinder said actuating element being articulated to said actuating pedal and connected to said brake power booster and said main brake cylinder, said actuating element assisted by said brake power booster applying a pulling force to said main brake cylinder to generate brake pressure.

5. A brake pedal mechanism for motor vehicles in accordance with claim 4, wherein said pivot axis location is between said pedal surface and an articulation point of said actuating element and said actuating element is a tie rod guided at an interface with said actuating pedal in an elongated hole in said actuating pedal.

6. A brake pedal mechanism for motor vehicles in accordance with claim 5, wherein said tie rod is connected to said central pulling piston rod of said main brake cylinder.

7. A motor vehicle brake pedal mechanism system, comprising:

an actuating pedal with a pedal surface and a portion extending from said pedal surface, said portion having a pivot axis;

a pedal block fastened to the body of the motor vehicle and providing a mount for supporting said actuating pedal to define a location of said pivot axis;

an actuating element connected to said actuating pedal, said actuating element having a pulling direction of movement, in the direction of the connection to said actuating pedal;

a brake power booster connected to said actuating element, said brake power booster being actuated by movement of said actuating element in the pulling direction of movement;

a main brake cylinder with a central pulling piston rod connected to said actuating element, said brake power booster being between said actuating element and said main brake cylinder and in series with said actuating element and said main brake cylinder said central pulling piston rod and said main brake cylinder moving in the pulling direction from a non-operative position toward said actuating element to generate brake pressure.

8. A brake pedal mechanism for motor vehicles in accordance with claim 7, wherein said main brake cylinder includes brake cylinder pistons and each of said pistons have a central hole, said pulling piston rod being arranged extending through each central hole.

9. A brake pedal mechanism for motor vehicles in accordance with claim 7, wherein said pivot axis location is between said pedal surface and an articulation point of said actuating element and said actuating element is a tie rod guided at an interface with said actuating pedal in an elongated hole in said actuating pedal.

10. A brake pedal mechanism for motor vehicles in accordance with claim 7, wherein said tie rod is connected to said central pulling piston rod of said main brake cylinder.

* * * * *